Patented Aug. 21, 1934

1,970,556

UNITED STATES PATENT OFFICE 1,970,556

MANUFACTURE OF AROMATIC SULPHONATES

Thomas S. Carswell, Kirkwood, Mo., assignor, by mesne assignments, to Monsanto Chemical Company, a corporation of Delaware No Drawing. Application October 5, 1929
Serial No. 397,742

20 Claims. (Cl. 260—159)

This invention relates to the sulphonation of aromatic hydrocarbons and it has particular application to the manufacture of the mono-sulphonates of benzene.

The object of the invention is to provide a process whereby one is enabled to make more efficient use of sulphonating acids, as well as to reduce the amount of sulphones which are formed as a by-product. A further object of the invention is to provide a method of manufacture which is readily adaptable to continuous operation and which at the same time shares the benefits aforementioned.

Benzene sulphonic acid is manufactured in large quantities as an intermediate in the synthesis of phenol. For this purpose any sulphones formed are lost since they cannot be causticized to form the corresponding phenol. It is important, therefore, that the sulphonation be conducted in such manner as to restrict the sulphone formation to a minimum.

The usual method of manufacturing benzene sulphonic acid is to react benzene with 20% oleum—that is sulphuric acid in which there is dissolved 20% sulphur trioxide. In addition to the loss which results from the formation of sulphones, the manufacturer is confronted with an additional loss which results from the fact that the sulphonation mixture at the end of the reaction must contain acid of a minimum concentration of about 80%. In other words, the effective sulphonation reagent is the sulphur trioxide and the sulphuric acid that is present in excess of that necessary to make up a mixture containing 80% sulphuric acid. By reason of this fact it is important to use acid which contains as much available sulphur trioxide as is commensurate with its cost, yields and equipment necessary for handling the acid in question.

Heretofore it has been customary to manufacture the acid by introducing 20% oleum into benzene while maintaining the temperature at approximately 70° C. Enough acid is added so that the final reaction mixture contains benzene sulphonic acid and 80% sulphuric acid. The use of stronger oleum resulted in the formation of excessive quantities of sulphones.

According to my invention, one is enabled to use an acid which is richer in the available sulphonating constituent and at the same time reduce the amount of sulphones which are produced by the present practice.

I have found that an acid of substantially 98% concentration will react with benzene almost instantaneously and that the principal factor which governs the rate of production is the abstracting of heat from the mass. For the sulphonation of benzene a reaction mixture should be maintained between 70° and 80° C. when employing an acid of substantially 98% concentration. It is to be noted that the sulphuric acid which is available for the sulphonation of the hydrocarbon varies with the temperature. Thus, at 70° C. a sulphonating acid must be of at least 85% strength. In other words, any sulphuric acid which is present over and above that necessary to make up an acid of 85% strength is available for sulphonation. At 110° C. any sulphuric acid which is present over and above that necessary to make up an acid mixture of 80% is available for sulphonation. Since, therefore, the sulphuric acid which is present in a sulphonating mixture which is necessary to make up an 80% acid mixture is not available for sulphonation even at 110° C., it will be apparent that the use of sulphonating acids containing a large excess of sulphur trioxide is desirable for most efficient operation.

Heretofore it has been impossible to use oleum of greater than 20% sulphur trioxide concentration, principally for the reason that it has been impossible to react the benzene with the strong oleum without incurring a large sulphone formation. I have found that by reacting the acid with the hydrocarbon while avoiding a large excess of either of the reacting ingredients sulphone formation is effectively reduced. Furthermore, I am able to employ oleum containing large amounts of sulphur trioxide without the production of large amounts of sulphone by adding the acid to the reaction mixture progressively during the sulphonation.

Briefly my invention consists in adding the acid and the aromatic hydrocarbon simultaneously and progressively to a reacting mixture while maintaining the temperature at approximately 70° C. and maintaining approximately 98% acid in the sulphonating mixture. Subsequently a sufficient additional amount of the aromatic hydrocarbon is added and the temperature of the batch is raised to approximately 110° C. to consume the remaining available sulphonating acid. The final product consists of a mixture of 80% acid and the aromatic sulphonate, the amount of sulphones formed being about 1% of the hydrocarbon consumed. To repeat the cycle a small amount of this reacting mixture is employed to which there is added progressively regulated amounts of oleum and the aromatic hydrocarbon. This procedure affords a saving in that it reduces the amount of sulphones and at the same time enables one to employ oleum of higher concentration than would otherwise be possible.

Specific examples of the principles hereinabove set forth, follow:

*Example 1.*—A sulphonating kettle which is provided with cooling and agitating means is charged with 610 pounds of 98% sulphuric acid, subsequently 545 pounds of 35.6% oleum and 217 pounds of benzene are added at rates proportional with their consumption over a period of five hours, keeping the temperature between 70° and 80° C. The acid in the sulphonator is maintained at substantially 98%, calculated upon the basis of the water present. After all of the benzene and oleum have thus been added, 179 pounds of additional benzene is mixed therein over a period of about 2 hours while maintaining the temperature as before. Thereafter the temperature of the mixture is raised to 110° C. to complete the sulphonation. The resulting mixture contains benzene sulphonic acid, 80% sulphuric acid calculated on the basis of the water present and less than 1% of sulphones calculated on the basis of the benzene consumed.

*Example 2.*—Into a sulphonator equipped as in Example 1 there is placed 235 pounds of the reaction mixture resulting from the procedure set forth above; a charge of 545 pounds of 35.6% oleum and 217 pounds benzene are fed continuously and at regulated rates over a period of 5 hours while maintaining the temperature at 45° C. and the acid concentration in the reacting mixture at approximately 98%. After all of the acid and benzene have been mixed, there is added 157 pounds of benzene and the temperature of the mixture is raised to about 110° C. to complete the sulphonation. Following this procedure one is enabled to economize on the amount of acid utilized and at the same time maintain the sulphone formation at about 1% of the benzene consumed.

*Example 3.*—The principles are susceptible to continuous operation. One such embodiment consists in adding benzene and oleum at uniform regulated rates to a sulphonator which is allowed to over-flow into a second sulphonator wherein benzene alone is added to consume all of the available sulphonating acid. The overflow from the second sulphonator is heated to about 110° C. for a sufficient length of time to complete the reaction.

In operating according to this embodiment one may advantageously employ as a starting mixture 235 pounds of the completely sulphonated product as in Example 2. 80 pounds of 35.6% oleum are added to bring the acid concentration up to 98% after which oleum and benzene are supplied to the first sulphonating kettle at rates of 150 and 60 pounds per hour respectively. Temperature is maintained between 70 and 80° C. Benzene is supplied to the second sulphonator at a rate of approximately 26 pounds per hour while maintaining the temperature as above. The overflow from the second sulphonator is received in a receptacle wherein the temperature of the mixture is raised and maintained at about 110° C. until all of the benzene has been sulphonated.

It will be apparent that the principles of my invention, according to which a sulphonating mixture is maintained under substantially constant regulated conditions for the optimum production of benzene sulphonic acid and to the minimum production of sulphones is applicable to many, widely different embodiments. Thus for example other concentrations of oleum may be employed; furthermore other aromatic hydrocarbons may be so treated. The invention enables one to make more efficient use of the acid than has been possible heretofore. Furthermore, the sulphones which heretofore under the most favorable commercial conditions, consumed upwards of 2% of the benzene treated are reduced substantially.

Although there are described several examples embodying the principles of my invention and I have indicated certain modifications which may be incorporated, the invention is not so limited but is applicable to many other widely different embodiments without departing from the spirit thereof and I desire, therefore, that it be limited only as indicated in the claims.

What I claim is:

1. In the sulphonation of an aromatic hydrocarbon with oleum the improvement which consists in adding the hydrocarbon and the oleum to a bath comprising a reacted oleum-aromatic hydrocarbon mixture progressively during the sulphonation in such proportions that a substantial unreacted excess of either constituent is at no time present.

2. In the sulphonation of an aromatic hydrocarbon wherein oleum of high sulphur trioxide content is employed as a sulphonating agent, the method of limiting sulphone formation which consists in adding oleum and the hydrocarbon to a bath comprising a reacted oleum-hydrocarbon mixture progressively during the sulphonation in such proportions that a substantial unreacted excess of either constituent is at no time present, and subsequently adding a quantity of the hydrocarbon sufficient to consume all the available acid and raising the temperature of the charge.

3. The method of sulphonating benzene by which sulphone formation is restricted which comprises adding benzene and oleum containing more than 20% free sulphur trioxide simultaneously and progressively to a bath comprising a reacted oleum-benzene mixture, the concentration of the acid in the reacting mixture being maintained substantially below that of the oleum during the reaction and subsequently adding a quantity of benzene sufficient to consume all the available acid and raising the temperature of the charge.

4. The method of sulphonating benzene by means of concentrated oleum whereby sulphone formation is restricted which comprises adding benzene and oleum simultaneously and progressively to a reacted mixture from a previous sulphonation, the addition of the said oleum and benzene being so regulated with respect to the rate of reaction that the concentration of the sulphonating reagent is maintained at all times throughout the reaction cycle substantially constant thereafter adding a quantity of benzene and raising the temperature of the mass.

5. The method of sulphonating benzene by means of concentrated oleum whereby sulphone formation is restricted which comprises adding benzene and oleum simultaneously and progressively to a reacted mixture from a previous sulphonation, the addition of said oleum and benzene being so regulated with respect to the rate of sulphonation whereby the concentration of the acid in the reacting mixture is maintained at approximately 98%.

6. The method of sulphonating benzene by means of concentrated oleum whereby the sulphone formation is restricted which comprises adding benzene and oleum simultaneously and progressively to a reacted mixture from a previous sulphonation, the addition of said oleum and benzene being so regulated with respect to the temperature and rate of sulphonation whereby the concentration of the available sulphonating agent is maintained at all times throughout the reaction cycle substantially constant, subsequently adding a substantial amount of benzene and raising the temperature of the reaction mixture.

7. The method of sulphonating benzene by means of concentrated oleum whereby sulphone formation is restricted which comprises adding benzene and oleum simultaneously and progressively to a reacted mixture from a previous sulphonation, the addition of the said oleum and benzene being so regulated with respect to the rate of sulphonation whereby the concentration of the available sulphonating agent is maintained at all times throughout the reaction cycle substantially below the concentration of the sulphonating ingredient and subsequently adding benzene and raising the temperature of the reaction mixture, sufficient benzene being added to consume all of the available sulphonating reagent.

8. In the sulphonation of benzene the cycle of operation which consists in mixing benzene and oleum progressively while maintaining the concentration of acid in the mixture substantially below 20% free sulphur trioxide while avoiding a substantial unreacted excess of either of the constituents, subsequently adding an additional amount of benzene and raising the temperature of the sulphonating mixture.

9. The method of sulphonating benzene which comprises adding benzene and oleum simultaneously and progressively to a bath comprising a reacted oleum-benzene mixture at a rate whereby the concentration of the acid is maintained at approximately 98%, interrupting the addition of the oleum, adding sufficient benzene to consume the remaining available acid, heating the mixture to approximately 110° C., discharging a portion of the reacted mixture and repeating the cycle.

10. The process of sulphonating benzene continuously while limiting the sulphone formation wherein oleum is employed as a source of the sulphonating agent which comprises mixing benzene and oleum at regulated rates whereby the concentration of the sulphonating agent is maintained substantially below that present in the oleum and an unreacted excess of either of the constituents is avoided, conducting the reaction mixture into a second zone wherein sufficient benzene is added to consume the available sulphonating acid and finally heating the mixture to an elevated temperature whereby the reaction completes itself.

11. In the sulphonation of aromatic hydrocarbons the cycle of operation which includes adding oleum and the hydrocarbon at regulated rates to a bath comprising a reacted oleum-hydrocarbon mixture wherein at no time during the sulphonation is there a substantial excess of either of the reacting ingredients under the conditions of operation, thereafter adding an additional amount of hydrocarbon and raising the temperature of the reaction mixture whereby all of the hydrocarbon and sulphonating acid is consumed.

12. That step in the manufacture of aromatic sulphonic acids whereby sulphone formation is restricted which comprises adding oleum and the hydrocarbon progressively to a bath comprising a reacted oleum-hydrocarbon mixture which is maintained at a regulated temperature, the rate at which the respective reacting ingredients are added being such as to consume completely all of the available sulphonating acid under the conditions prevailing in the sulphonating mixture while avoiding an excess of the hydrocarbon, subsequently adding a quantity of hydrocarbon and thereafter raising the temperature of the reacting mixture to consume the additional quantity of hydrocarbon and the acid which is made available for sulphonation at the elevated temperature.

13. In the sulphonation of aromatic hydrocarbons by means of oleum containing more than 20% sulphur trioxide the method of restricting sulphone formation which comprises reacting the oleum and the aromatic hydrocarbon in a liquid medium comprising a reacted oleum-hydrocarbon mixture under regulated conditions whereby there is at no time a substantial excess of either of the reacting constituents in the mixture.

14. In the sulphonation of benzene whereby benzene and oleum are reacted, that step which comprises admixing the oleum and the benzene in a liquid medium comprising a reacted oleum-benzene mixture progressively at substantially the same rates at which they are consumed and in the absence of a substantial excess of either reacting constituents.

15. In the sulphonation of benzene, wherein the acid and benzene are reacted at 70° to 80° C., that step which consists in adding at the end of the sulphonation an amount of benzene and raising the temperature of the mixture sufficiently to effect further reaction of the resulting hydrocarbon and acid containing mixture.

16. In the sulphonation of an aromatic hydrocarbon of the benzene series the improvement which consists in adding the hydrocarbon and oleum to a bath comprising a reacted oleum-aromatic hydrocarbon mixture progressively during the sulphonation in such proportions that a substantial unreacted excess of either reactant is at no time present.

17. In the sulphonation of an aromatic hydrocarbon of the benzene series wherein oleum containing more than 20% sulphur trioxide is employed as a sulphonating agent, the method of limiting sulphone formation which consists in adding oleum and the hydrocarbon to a bath comprising a reacted oleum-hydrocarbon mixture progressively during the sulphonation while avoiding an unreacted excess of either reactant in the mixture and subsequently adding a quantity of the hydrocarbon sufficient to consume available unreacted acid and raising the temperature of the charge whereby such acid is consumed.

18. In the sulphonation of benzene where oleum containing more than 20% trioxide is employed as a sulphonating medium, the method by which sulphone formation is limited, which consists in adding oleum and benzene progressively, to a bath comprising a reacted oleum-benzene mixture, under regulated temperature conditions, while avoiding an unreacted excess of either reactant in the mixture, and subsequently adding a quantity of benzene, sufficient to consume available unreacted acid at a higher temperature, and raising the temperature of the charge whereby such acid is consumed.

19. In the sulphonation of benzene where oleum containing more than 20% trioxide is employed as a sulphonating medium, the method by which sulphone formation is limited, which consists in adding oleum and benzene progressively, to a bath comprising a reacted oleum-benzene mixture and maintained at approximately 70°C.–80° C. during the sulphonation while avoiding an unreacted excess of either reactant in the mixture, and subsequently adding a quantity of benzene, sufficient to consume available unreacted acid at a higher temperature, and raising the temperature of the charge whereby such acid is consumed.

20. The method as defined in claim 19 and further characterized in that the temperature of the reaction mixture is raised to approximately 110° C.

THOMAS S. CARSWELL.